(12) United States Patent
Derhak (10) Patent No.: US 6,445,466 B1
(45) Date of Patent: Sep. 3, 2002

(54) SYSTEM AND METHOD FOR LEVEL BASED IMAGE REPRODUCTION

(75) Inventor: Maxim Wasyl Derhak, West Jordan, UT (US)

(73) Assignee: Onyx Graphics Corporation, Midvale, UT (US)

( * ) Notice: Subject to any disclaimer, the term of this patent is extended or adjusted under 35 U.S.C. 154(b) by 0 days.

(21) Appl. No.: 09/414,390

(22) Filed: Oct. 7, 1999

(51) Int. Cl.[7] .......................... H04N 1/46; H04N 1/405

(52) U.S. Cl. ...................... 358/1.9; 358/523; 358/524; 358/3.06; 358/3.13

(58) Field of Search ........................... 358/1.1, 1.8, 1.9, 358/523, 534, 535, 455, 456, 457, 298

(56) References Cited

U.S. PATENT DOCUMENTS 5,175,804 A  12/1992 Wittmann .................. 395/108
5,473,355 A * 12/1995 Inui .......................... 347/183

OTHER PUBLICATIONS

Fredrik Nilsson, "Precomputed Frequency Modulated Halftoning Maps that Meets the Continuity Criterion," IS&T's NIP12: International Conference on Digital Printing Technologies, Oct. 27–Nov. 1, 1996, pp. 72–77.

* cited by examiner

Primary Examiner—Thomas D. Lee
(74) Attorney, Agent, or Firm—Workman, Nydegger & Seeley (57) ABSTRACT

Provided are systems and methods for rendering a halftone image on a medium. The original continuous tone image is divided into a plurality of pixels and each pixel is representative of an area of the original image. Each pixel may comprise a plurality of dots and a level represents the number of dots to be placed within the pixel. Level also refers to an amount of ink which is placed on a medium. Each level is represented as a dot placement and potential dot placements are stored in a data structure. The data structure is large enough to hold the potential levels of one or more pixels. Thus, more than one pixel can be processed and rendered at the same time. The data structure is referenced by the levels of the pixel to be printed and the dot placement stored at the referenced level is output to the output device. Alternatively, the level can represent the number of times a particular printing head will fire or, in the case of a printer having multiple heads per color, which heads will fire for a particular pixel. In this manner, the levels of the halftone image are reproduced on an image. The systems and methods for the present invention permit an original image to be rendered at high resolutions while they are processed at lower resolutions.

33 Claims, 6 Drawing Sheets

LEVEL 0 = 0
LEVEL 1 = 1-10
LEVEL 2 = 11-20
LEVEL 3 = 21-36

SYSTEM AND METHOD FOR LEVEL BASED IMAGE REPRODUCTION

BACKGROUND OF THE INVENTION

1. Field of the Invention

The present invention relates to image processing. More particularly, the present invention relates to low resolution processing with high resolution printing.

2. Present State of the Art

Reproducing an image can be a difficult and costly process because many printers and printing devices and other output devices do not have the capability to produce continuous tone reproductions of images. Instead, the images which are reproduced in posters, magazines, newspapers and other products are created using a halftoning process which places tiny dots of ink in close proximity to one another. Because the dots of ink are small and close together, the human eye effectively sees continuous color.

Halftoning creates an illusion of continuous color and by varying the quantity of different inks which make up the image, a large number of different colors can be created. For instance, the main difference between black and gray in a halftone image is the number of tiny black ink dots placed on the printed product. By placing fewer dots on, for example, a white paper, the human eye effectively blends the whiteness of the paper with the tiny black dots to produce a shade of gray.

One of the primary color schemes employed in image reproduction uses cyan, magenta, yellow and black "CMYK" to produce color prints or reproductions. Each of these four colors is printed such that the desired colors and shades of colors of the original image are reproduced in the printed image and perceived by the human eye. In CMYK color schemes, a separate halftone image is created for each color and each halftone image is separately printed as the original image is being rendered on a medium. Each of the four halftone images is essentially printed on top of the other halftone images and the mixture of these colors produces the desired image. The separate colors are not printed directly on top of each other because the black dots of ink would effectively mask or block the cyan, magenta and yellow dots of ink. Rather, the dots are arranged in configurations, such as a rosette, well known in the prior art.

The amount and placement of the dots also has an affect on the resolution or sharpness of the image being reproduced. The human eye effectively blends halftone dots having densities of approximately 150 dots per inch (dpi). As technology has progressed, resolutions having halftone dot densities on the order of 1440 dpi and higher are possible. However, the resolution chosen for a particular image is usually dependent on the application and the cost. Newspapers, for example, typically employ lower resolutions while some posters are rendered at very high resolutions.

The ability to render an image at high resolutions comes at a cost. High resolution images require a substantial amount of memory to store the image and require a significant amount of time to process the image. These costs are incurred because a higher resolution necessarily has more dots to be printed or placed and each dot is typically processed for each color in the color scheme being used. For instance, a continuous tone image which is going to be reproduced is frequently an RGB (red, green and blue) image. In this image, 8 bits are used to describe the red portion, 8 bits to describe the green portion and 8 bits to describe the blue portion. The original image uses 24 bits to describe each pixel of the image. During processing of the image, the RGB color scheme is typically converted to the CMYK color scheme and the image is cropped and sized before the image is ready to be reproduced by a printer.

A significant problem is that while an image can be represented using a large number of bits for each pixel, the device which ultimately renders the reproduced image is typically capable of being either on or off. In other words, a typical printer can either place a dot or not place a dot and only one bit is required to perform this particular function. At the same time, representing an image with one bit per pixel is simply not an adequate method for reproducing an image. As a consequence, an image which is to be printed at a high resolution simply requires a lot of memory and time to reproduce the image.

It would be a significant advance in the art to be able to be able to render or reproduce an image with high resolution while reducing the memory and time requirements associated with the reproduced image.

OBJECTS AND SUMMARY OF THE INVENTION

It is an object of one embodiment of the present invention to render an image at higher resolutions while processing the image at lower resolutions.

It is another object of one embodiment of the present invention to reproduce an image using levels.

It is a further object of one embodiment of the present invention to reduce the memory required to reproduce an image.

It is another object of one embodiment of the present invention to reduce the time required to process an image which is being reproduced.

It is yet another object of one embodiment of the present invention to create a data structure for storing the dot placements of various levels.

It is a further object of one embodiment of the present invention to render a plurality of pixels simultaneously.

It is another object of one embodiment of the present invention to represent the output file of a processed image in levels.

The present invention provides for reproducing an image using less memory and less processing time without sacrificing significant resolution. In one embodiment, an original image is partitioned into pixels. The pixel size may vary, but is usually a fixed size for a particular image, and each pixel is comprised of a plurality of dots. Each dot is representative of an ink dot. After the image has been divided into pixels, each pixel is processed to determine a level. The level of the pixel is related to the quantity of ink that will be used to reproduce that pixel.

After a level has been assigned or associated with the pixels, all potential levels are stored in a data structure. The data structure contains the dot placement for all potential levels of ink. When a particular pixel is to be printed or reproduced, the data structure is accessed according to the level of the pixel being reproduced and the dot placement is reproduced by the printing or other output device on some medium. The dot placement is randomized to avoid undesirable effects in the reproduced image such as a moire effect.

In another embodiment, the levels generated by the processing may be used to cause a particular printer head to fire multiple times. The ability to fire or not fire a printer head a variable number of times permits various levels of ink to be placed on the medium receiving the ink dots. In another embodiment, the output device may have multiple heads of a single color and the level determines which of those heads will fire for a given level. This also permits varying quantities of ink to be placed on a medium. In this manner, the image is reproduced according to the levels assigned to the pixels. In yet another embodiment, the levels can represent the size of the ink dot to be rendered.

Depending on the desired resolution of the processed image, a plurality of pixels can be represented and rendered simultaneously. For instance, a byte can be divided into four pairs of bits. Each pair of bits is capable of representing four distinct outputs for four separate pixels. Thus, four pixels are simultaneously processed in this embodiment.

Additional objects and advantages of the present invention will be set forth in the description which follows, and in part will be obvious from the description, or may be learned by the practice of the invention. The objects and advantages of the invention may be realized and obtained by means of the instruments and combinations particularly pointed out in the appended claims. These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF THE PREFERRED EMBODIMENTS

The process of reproducing an image usually begins with a continuous tone original image such as a photograph, a slide, a film transparency or other source. The continuous tone original image, which includes black and white images, is received by an input device and converted to an electronic format which is stored, typically, in a computer. The stored image is usually represented as a RGB image or a CMYK image, but can be stored and represented in any other format. Regardless of the format of the original image, it is typically converted to a preferred CMYK format, but may be converted to any format including but not limited to RGB, CMYK orange green, and CMY. Once the image is stored in the appropriate color scheme, it is processed to account for color correction, cropping and sizing and other modifications. After the image has been processed, it is ready to be reproduced on some other surface.

Typical printers and printing presses, however, cannot reproduce the original image in continuous color. Instead, the image is reproduced using halftones dots which provide the appearance of continuous color. Halftoning, in simple terms, is the process of rendering an image with a plurality of tiny ink dots. Because the image is not reproduced in continuous color, a significant amount of processing time and computer memory is required for the reproduced image. In an image having high resolution, each dot of ink is processed which can be a burdensome task for a computer. This task is further complicated because it must be repeated for each color in the relevant color scheme.

The present invention processes the continuous tone original image which has been digitized such that the image is represented by levels. How the image is digitized into the multilevels is discussed in more detail in co-pending application entitled "System and Method for Multi-Level Processing With Level Limiting," U.S. patent application Ser. No. 09/414,392, filed on Oct. 7, 1999, and assigned to the same assignee as the present application. This co-pending application is hereby incorporated by reference in its entirety.

Level refers to a percentage of ink that will ultimately be printed in a particular area, which is defined herein as a pixel. Thus a pixel can be a single dot placed by a output device or a plurality of dots placed by the output device. Once the levels have been computed from the original image, the data is stored in a data structure that is referenced, in one embodiment, according to the level of the pixel or pixels to be printed. The nature of the levels and the data structure permit a plurality of pixels to be processed and printed simultaneously.

The present invention is described in terms of diagrams and flow charts. Using the diagrams and flow charts in this manner to present the invention should not, however, be construed as limiting its scope.

The embodiments of the present invention may comprise a special purpose or general purpose computer comprising various computer hardware. Other embodiments within the scope of the present invention also include computer-readable medium having computer-executable instructions or data structures stored thereon. Such computer-readable medium can be any available medium which can be accessed by a general purpose or special purpose computer. By way of example, and not limitation, such computer-readable medium can comprise RAM, ROM, EPROM, CD-ROM or other optical disk storage, magnetic disk storage or other magnetic storage devices, or any other medium which can be used to store the desired executable instructions or data structures and which can be accessed by a general purpose or special purpose computer.

When information is transferred or provided over a network or other communications connection to a computer, the computer properly views the connection as a computer-readable medium. Thus, such a connection is also properly termed a computer-readable medium. Combinations of the above should also be included within the scope of computer-readable medium. Computer-executable instructions comprise, for example, instructions and data which cause a general purpose computer, special purpose computer, or special purpose processing device to perform a certain function or group of functions. The computer-executable instructions and associated data structures represent an example of program code means for executing the steps of the invention disclosed herein.

Figure 1:
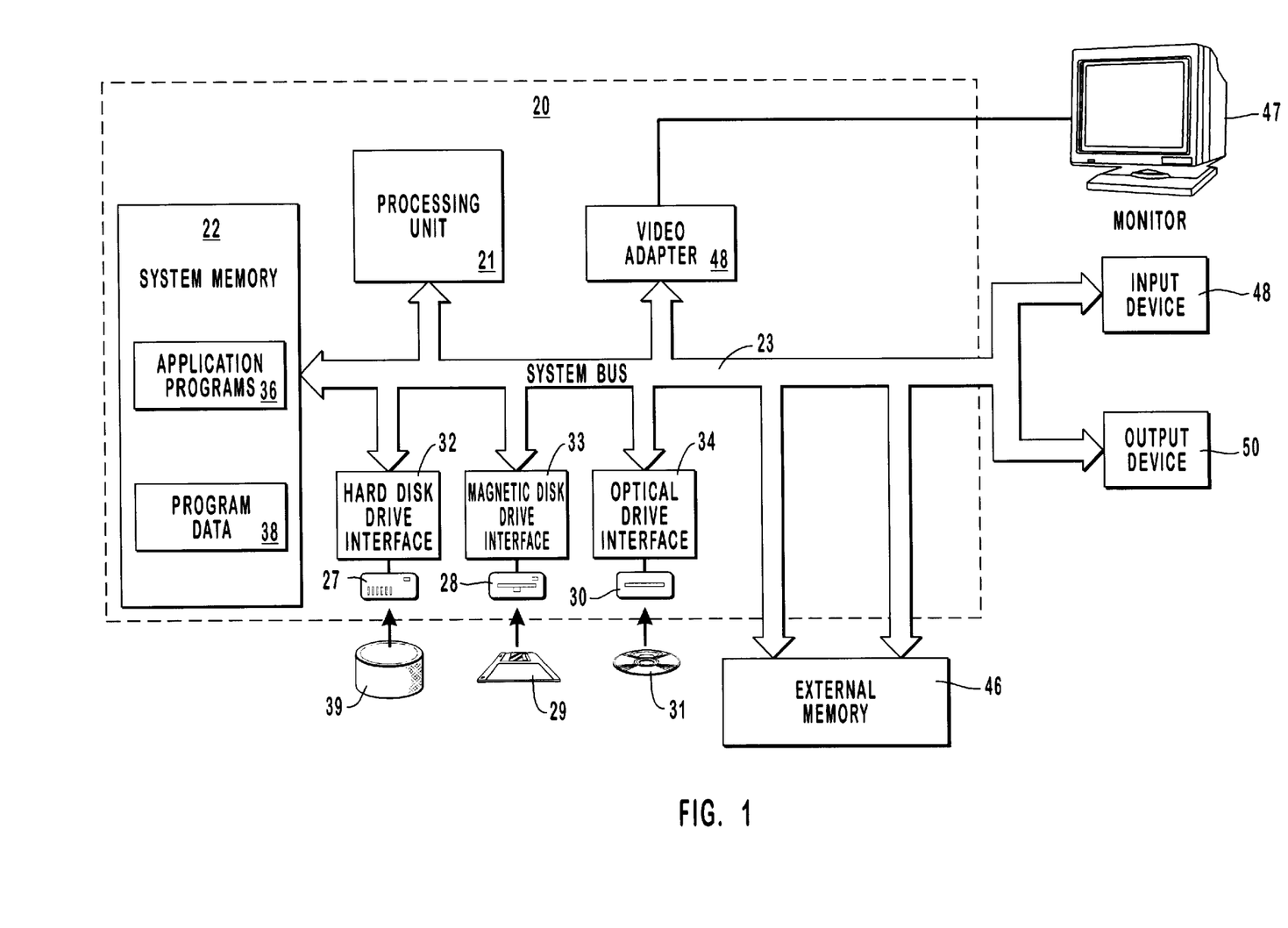
FIG. 1 is a block diagram of an exemplary system for implementing the present invention.

FIG. 1 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor-based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

With reference to FIG. 1, an exemplary system for implementing the invention includes a general purpose computing device in the form of a conventional computer 20, including a processing unit 21, a system memory 22, and a system bus 23 that couples various system components including the system memory to the processing unit. The system bus 23 may be any of several types of bus structures including a memory bus or memory controller, a peripheral bus, and a local bus using any of a variety of bus architectures. The system memory includes read only memory (ROM) and random access memory (RAM).

The computer 20 may also include a magnetic hard disk drive 27 for reading from and writing to a magnetic hard disk 39, a magnetic disk drive 28 for reading from or writing to a removable magnetic disk 29, and an optical disk drive 30 for reading from or writing to removable optical disk 31 such as a CD-ROM or other optical medium. The magnetic hard disk drive 27, magnetic disk drive 28, and optical disk drive 30 are connected to the system bus 23 by a hard disk drive interface 32, a magnetic disk drive-interface 33, and an optical drive interface 34, respectively. The drives and their associated computer-readable medium provide nonvolatile storage of computer readable instructions, data structures, program modules and other data for computer 20. Although the exemplary environment described herein employs a magnetic hard disk 39, a removable magnetic disk 29 and a removable optical disk 31, it should be appreciated by those skilled in the art that other types of computer readable medium which can store data that is accessible by a computer, such as magnetic cassettes, flash memory cards, digital video disks, Bernoulli cartridges, random access memories (RAMs), read only memories (ROM), and the like, may also be used in the exemplary operating environment.

A user may enter commands and information into the computer 20 through input devices such as a keyboard and pointing device such as a mouse. Other input devices 37 may include a digital camera, a facsimile, a scanner, or the like. These and other input devices are often connected to the processing unit 21 through a serial port interface that is coupled to system bus 23, but may be connected by other interfaces, such as a parallel port, game port or a universal serial bus (USB) port. A monitor 47 or other type of display device is also connected to system bus 23 via an interface, such as video adapter 48. In addition to the monitor, personal computers typically include other peripheral output devices 50, such as printers, plotters, facsimile machines, modems, speakers which can receive output data from computer 20.

The computer 20 may operate in a networked environment using logical connections to one or more remote computers. The remote computer may be another personal computer, a server, a router, a network PC, a peer device or other common network node, and typically includes many or all of the elements described above relative to the computer 20. As illustrated, computer 20 also comprises external memory 53 which is intended to be representative of other resources available to computer 20. Those resources may include, but are not limited to local area networks and remote storage, wide area networks including the Internet, and intranets. Application programs 36 may be resident on either computer 20 or in external memory 53.

Figure 2:
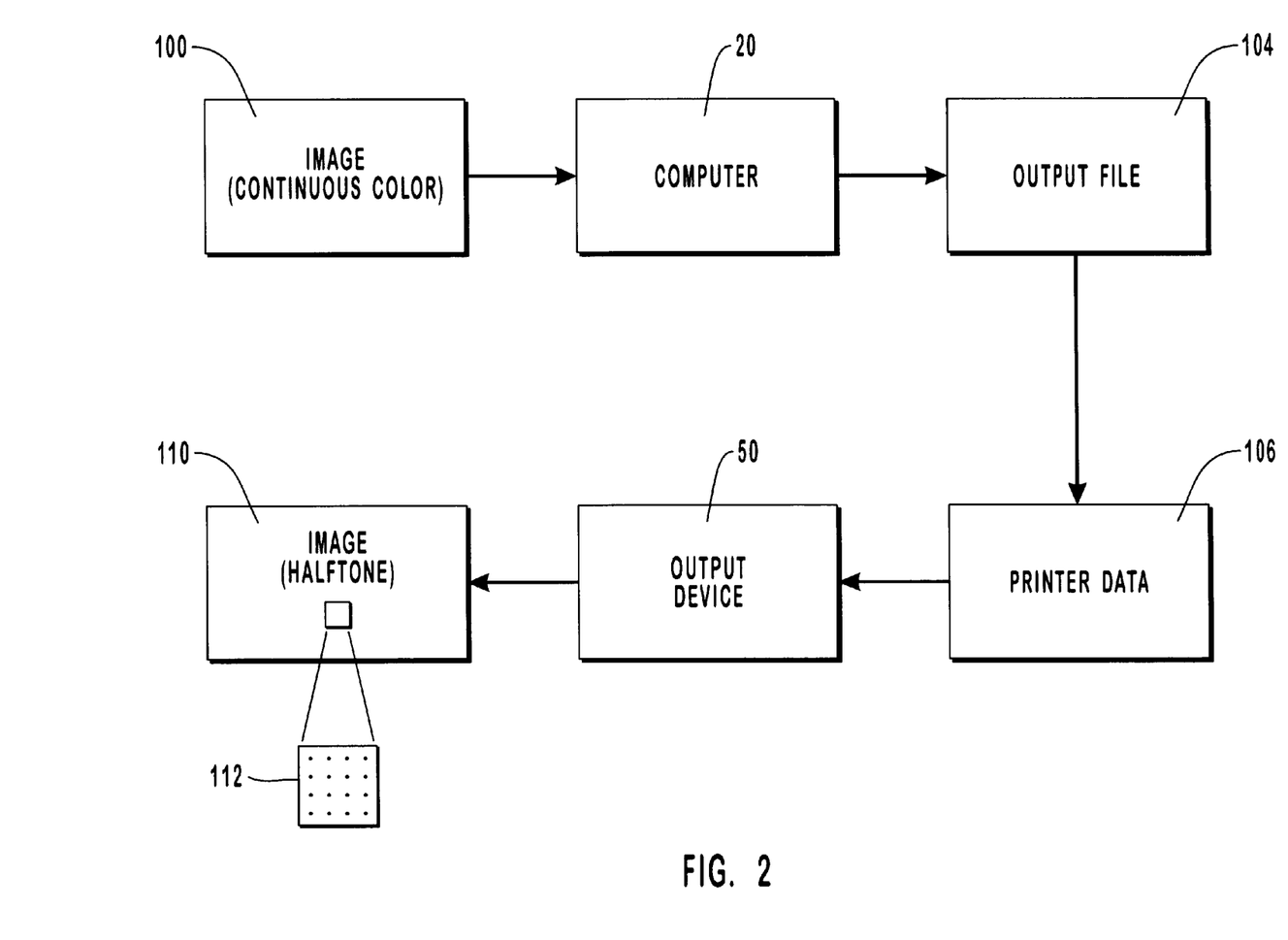
FIG. 2 is a block diagram illustrating an exemplary method of processing and reproducing a continuous image.

FIG. 2 is a block diagram generally illustrating one presently preferred embodiment of the process of reproducing an image. Image 100 is typically a continuous tone image taken from, for example, a film transparency, color print or other source, and image 100 may be in color or black and white. As described in FIG. 1, computer 20 comprises means for receiving image 100 such as a scanner, a facsimile, a digital camera or other input device. Computer 20 processes image 100 to produce output file 104.

In one embodiment, processing image 100 includes several steps. Image 100 is separated by computer 20 into the colors of the relevant color scheme such as CMYK. In a CMYK color scheme, image 100 is broken down into a cyan image, a magenta image, a yellow image and a black image. Next, the separate images are partitioned into discrete areas or pixels and each pixel is assigned a level which refers, in one embodiment, to the percent of color within the defined pixel. In another embodiment, level refers to the number of dots within the defined pixel. Output file 104 is, in one embodiment, the digital representation of image 100 after it has been processed by computer 20. From output file 104, printer data 106 is created and sent to output device 50, which renders image 110 on a surface or medium such as paper.

Image 110 is a reproduction of image 100 with several differences. The major difference is that image 100 is a continuous tone image and image 110 is a halftone image. This difference is illustrated by pixel 112 which magnifies a portion of image 110 and shows that image 110 is actually a plurality of tiny dots which have been placed or printed on the medium. Depending on the color at pixel 112, a user can expect to see cyan, magenta, yellow and black ink dots. To the human eye, and without magnification, the dots are effectively blended providing the appearance of a continuous tone image and the respective amounts of inks determines the color viewed by the human eye.

Depending on how image 100 is processed by computer 20 and the capabilities of output device 50, the number of dots on image 110 may vary. As described previously, the number of dots is related to the resolution of image 110 and are typically expressed in dots per inch (dpi). A low resolution image has, for example, 180 dpi and a high resolution image has, for example, 1440 dpi. Images having other resolutions are possible.

The desired resolution typically has a substantial affect on the processing time and memory required for a particular image. Lower resolution images typically require less disk space or memory and less processing time. As previously mentioned, one advantage of one embodiment of the present invention is the ability to produce a high resolution image using processing times and disk storage or memory requirements more on the order of lower resolution images.

Figure 3:
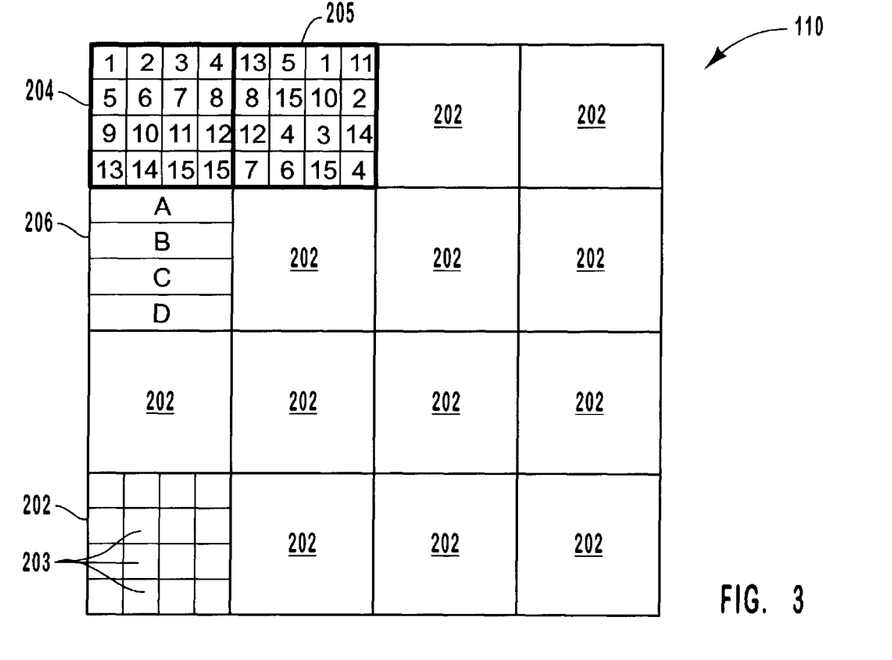
FIG. 3 is a schematic illustration of a group of pixels and illustrates that a pixel may be made up of a plurality of ink dots.

As used herein, "pixel" refers to an area and may comprise one or more dots. "Dots," as used herein, refers to the placement of ink on a medium as well as the percentage of ink in a defined area. Thus, the more dots that are placed in a pixel, the greater a level the pixel represents. However, a printer typically has the ability to either place a dot or to not place a dot. FIG. 3 is a more detailed block diagram of a reproduced image 110 illustrating how the dots are placed within a particular pixel. In the example illustrated by FIG. 3, image 110 comprises 16 pixels 202. Each pixel 202, in this example, has 16 potential dots 203 arranged in a four by four array. Other potential pixel arrangements or arrays are possible and comprise: four potential dots in a two by two array; six potential dots in a two by three array; twelve potential dots in a four by three array; and 24 potential dots in a four by six array. Embodiments of the present invention are discussed in reference to pixel 202, which is a four by four array of dots, but may be applied to other pixel arrangements, including but not limited to those listed herein.

If image 110 in FIG. 3 were printed at a resolution of 1440 dpi, then image 110 is represented, in this embodiment, as having 360 pixels per inch, because each pixel has 4 of the 1440 dots in each inch. However, each pixel 202 may be viewed as one dot in a 360 dpi image. In other words, if image 110 were printed in 360 dpi, then each pixel 202 would be replaced with a single dot. This is significant because image 110 may be processed as a 360 dpi image rather than a 1440 dpi image while the output will be 1440 dpi. Each pixel 202 contains from 0 to 16 dots which may also be represented in percentages. Thus if pixel 202 contains 8 dots, then it is 50 percent filled. Because the dots placed on a printing medium are discrete, the number of dots in a particular pixel correspond to a particular level which is usually defined when the image is processed.

Figure 4:
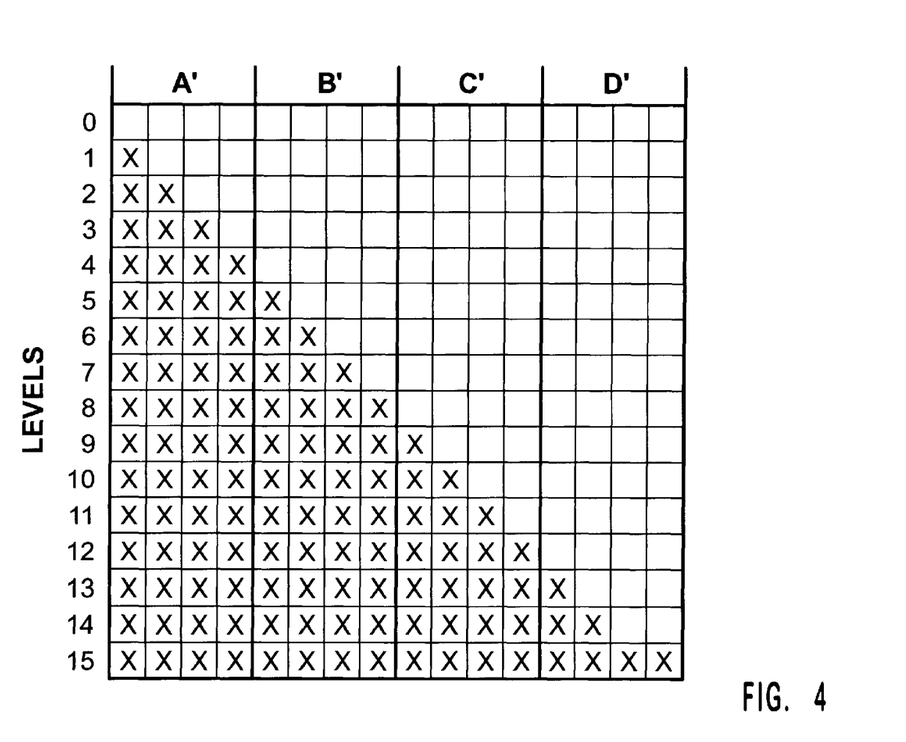
FIG. 4 is a schematic illustration of exemplary levels which may be place in a pixel by varying the number of dots actually printed in the pixel.

One embodiment of the levels of dots is illustrated in FIG. 4 where as depicted, each "x" represents a dot. Because the absence of dots can be interpreted as a level of dots, a pixel array may potentially have more levels of dots than there are dots in the array. For example, a four by four dot array can have 17 levels of dots or a four by three dot array can potentially have 9 levels of dots. The embodiment of FIG. 4 illustrates 16 levels of dot, in a four dot by four dot pixel array and in this embodiment, level 15 has two more dots than level 14. This is illustrative that the number of potential levels of dots is not necessarily equal to the number of actual levels of dots. In this embodiment, if no dots are placed in pixel 202, then the level of the pixel is 0 and each successive level receives, at a minimum, one additional dot until pixel 202 has 16 dots, which corresponds, in this embodiment, to level 15. In other embodiments, the actual number of levels of dots can vary, but each level has at least one more dot than the preceding level. Because FIG. 4 is illustrative of a four by four dot array, a preferred embodiment implements 16 levels of dots and all levels can be referenced by four bits. To address an additional level requires a fifth bit.

Once a level has been determined for a particular pixel 202, the requisite number of dots are printed in that pixel. The pixels of FIG. 3 are used to illustrate one embodiment of how the dots corresponding to a particular level are placed in a particular pixel. In pixel 204, each dot is illustrated with a different number. The numbers range, in this embodiment from 0 to 15. If it is determined that pixel 204 has a level 7, then the number in each dot location 203 is compared to the pixel level. If the number of the dot location is less than the level, then a dot is placed. For a pixel having a level of 7, dot locations numbering 0 through 6 receive a dot and dot locations numbering 7–15 do not receive a dot. In this manner, the appropriate number of dots are placed in pixel 204. A preferred embodiment is illustrated in pixel 205 where the numbers of the dot locations are randomized such that the placed dots are randomly located within the area of the pixel. Placing dots in pixels such as pixel 204 may result in a moire effect. In some embodiments the effective number of output levels is reduced because the randomizing may cause some pixels to have additional dots.

Pixel 206 illustrates another method for placing dots in a pixel. Pixel 206 illustrates four rows: A, B, C and D. Each row comprises, in this embodiment, four dots. For a pixel having a four by four dot array, FIG. 4 illustrates the potential levels and is divided into columns A', B', C' and D'. The four dot placements in column A' correspond to the four dots of row A of pixel 206 in FIG. 3. Similarly, columns B', C' and D', correspond to rows B, C, and D respectively. This method permits a simple look-up table to be used for the placement of dots within a particular pixel.

For example, if the level of pixel 206 is determined to be 6, then the dots in column A' corresponding to level 6 which are placed in row A of pixel 206, the dots in column B' corresponding to level 6 are placed in row B of pixel 206, the dots in column C' corresponding to level 6 are placed in row C of pixel 206, and the dots in column D' corresponding to level 6 are placed in row D of pixel 206. Thus row A receives four placed dots, row B receives two placed dots, and rows C and D receive no placed dots. In this manner, pixel 206 is filled with the appropriate number of dots for level 6. Other levels are similarly placed. In order to avoid undesirable effects such as a moire effect, the dots of the lookup table in FIG. 4 are randomly located across each level row such that the ultimate placement of dots in pixel 206 is also randomized. In other words, a level 6 for pixel 206 may result in, for example, row A receiving 2 placed dots, row B receiving 1 placed dot, row C receiving 1 placed dot, and row D receiving 2 placed dots. Pixel 206 still receives the number of dots corresponding to the level of pixel 206, but they are randomly placed.

Figure 5:
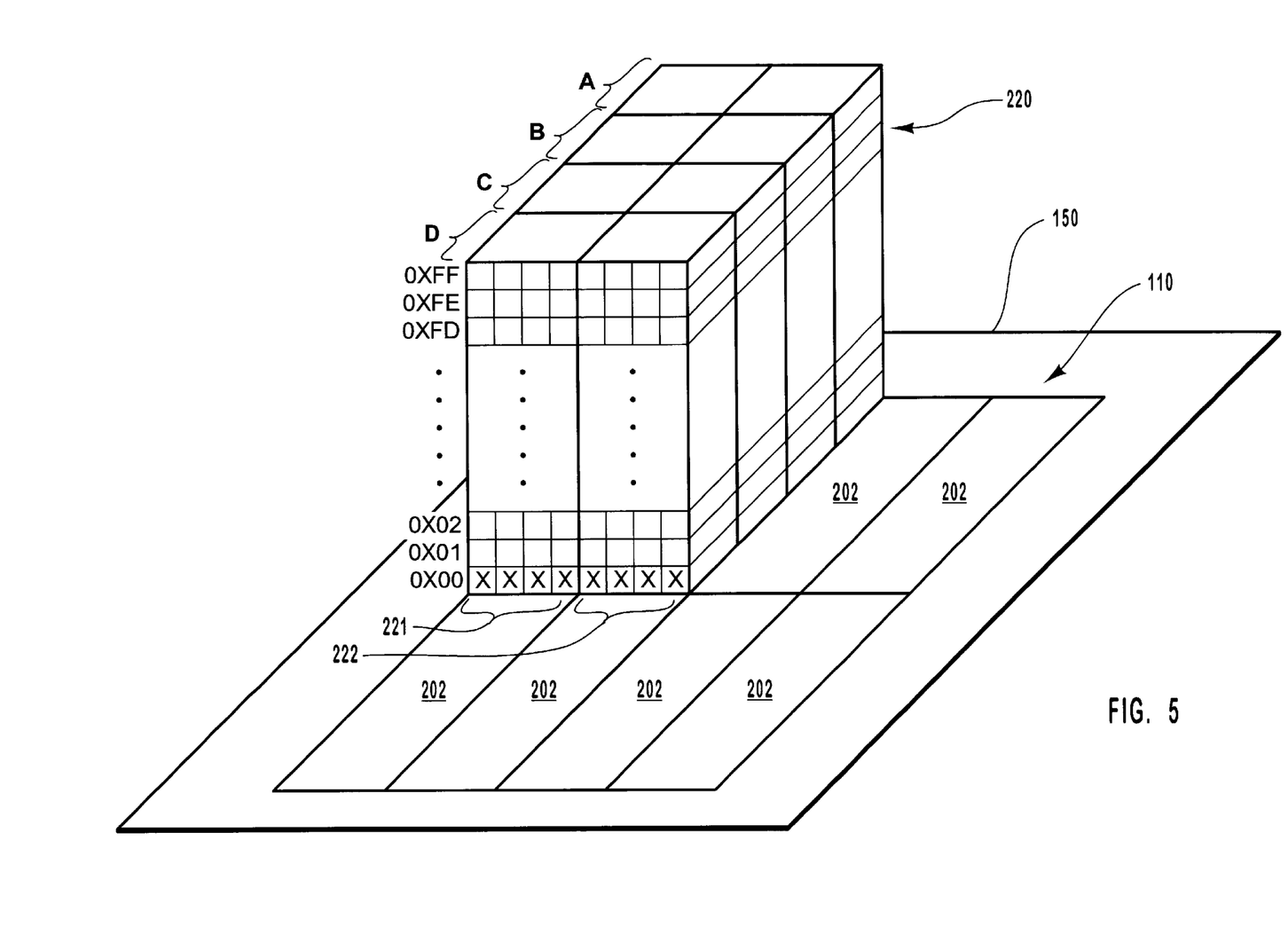
FIG. 5 is a schematic illustration of a data structure for storing the dot placement of a reproduced image.

FIG. 5 is a block diagram illustrating another embodiment of a method for placing dots. As illustrated in FIG. 5, medium 150 is intended to receive image 110, which comprises one or more pixels 202. Data structure 220 is illustrated as covering two pixels 202 of image 110. Structure 220 is illustrated having columns A, B, C and D, and rows 0×00 through 0×ff. Each row comprises, in this illustration, nibble 221 and nibble 222. Each nibble is four bits wide and each row is therefore a byte wide. In a preferred embodiment, each row of structure 220 has 6 bytes and structure 220 has 48 columns. These dimensions permit structure 220 to be adapted to a plurality of pixel dimensions which have been previously described. Structure 220, however, can be adapted to other dimensions as needed.

As illustrated, structure 220 is being used to print an image represented by pixels having four dots by four dots. Thus each pixel 202 can be represented by 17 different level of dots as described previously. However, because the pixel level is stored as four bits, only 16 levels of dots are used, in this embodiment, where one level of dots has two more dots than the preceding level. Structure 220 contains potential dot placements for all potential levels that represent image 110. The dots which comprise each level are stored in columns A, B, C and D of a single row. In other words, columns A, B, C, and D of row 1 represent level 0 and the total number of dots in this level is 0. The number of dots to be placed on medium 150 are contained within columns A, B, C and D of a particular row. However, each row has two nibbles or one byte, in this embodiment, and represents the dot placement of two separate pixels. Thus, when a pixel represents a four by four dot configuration, each byte of information represents part of two separate pixels. Because each pixel has a potential of 16 levels in this embodiment, there are 256 possible combinations between the two pixels. This configuration permits the dot placement of a plurality of pixels to be determined simultaneously.

The contents of structure 220 is pre-computed, in one embodiment, and therefore structure 220 essentially serves as a look up table when the pixels are actually printed. For example, if the first two pixels are going to be printed and the first pixel has a level of 0×07 in hexadecimal notation and the second pixel has a level of 0×08 in hexadecimal notation, then the dot placement for the two pixels is contained in row 0×78 of structure 220. More specifically, row 0×78 column A contains the first row of dots to be printed in the two pixels, row 0×78 column B contains the second row of dots to be printed in the two pixels, row 0×78 column C contains the third row of dots to be printed in the two pixels, and row 0×78 column D contains the fourth row of dots to be printed in the two pixels. In other words, the processing time is reduced because the same level number or row is used to access the contents of columns A, B, C and D. Thus one byte, rather than four bytes, is used to access and output, in this embodiment, four lines of dots which correspond to two pixels. Also, the number of dots in row 0×78 columns A through D will be equal to the number of dots that represent levels 7 and 8 respectively.

As previously mentioned, a preferred embodiment of structure 220 has larger dimensions. The reason for the larger dimensions is as follows. The dot placements contained in structure 220 will be used for the entire image 110, rather than just a few pixels. Essentially, the levels of the pixels are used to access structure 220 to determine the dot placement on medium 150. By expanding the dimensions of structure 220, it is possible to avoid repetitive patterns in image 110. In this embodiment, the dot placement is fixed for all pixels. As described previously, it is preferred that the actual dot placement within a particular pixel be randomized and by having a structure that contains the dot placement for a plurality of pixels, the actual dot placement on medium 150 is more randomized than for a structure containing the dot placement for one or two pixels.

In FIG. 5, each row of structure 220 is a first data field which stores a particular level. Columns A, B, C and D comprise second data fields which are accessible from each row or first data field. Accessing structure 220 by row and column provides access to a portion of a pixel which is to be rendered on a surface or other medium. In the embodiment illustrated in FIG. 5, for example, an access to row 1 column A provides the dot placement of the first row of dots of a pair of pixels. As stated previously, the number of pixels to be rendered is dependent, in one embodiment, on the dimensions of structure 220 and the pixel dimensions.

In general, the number of columns of structure 220 is divisible by both 4 and 6 and the width, in terms of bytes, of structure 220 is divisible by 3. As described previously, a preferred embodiment of structure 220 has dimensions of 6 bytes in width, 48 columns and 256 levels. The 48 columns is essentially 48 distinct lines of dots as partially illustrated in FIG. 7 discussed below. The 6 bytes is representative of 48 distinct dot placements because each bit in each byte represents a dot placement. Thus, each level of structure 220 is a 48 by 48 array of dots or dot placements. If the pixel size is four dots by four dots, then each level of structure 220 represents 144 pixels. If the pixel size is four by three dots, then each level of structure 220 represents 192 pixels. Structure 220 can represent a varying number of pixels which depends on the number of dots represented by a pixel. This permits, in one embodiment, pixels having the same level to be represented by different dot placements which can reduce or eliminate undesirable effects such as a moire effect. For instance, if the level of all the pixels in row 1 had a level of one and each dot placement was in the same place within each pixel, then the image would reflect this geometric shape. If the dot placement within each level is randomized, then the image does not reflect this effect.

Figure 6:
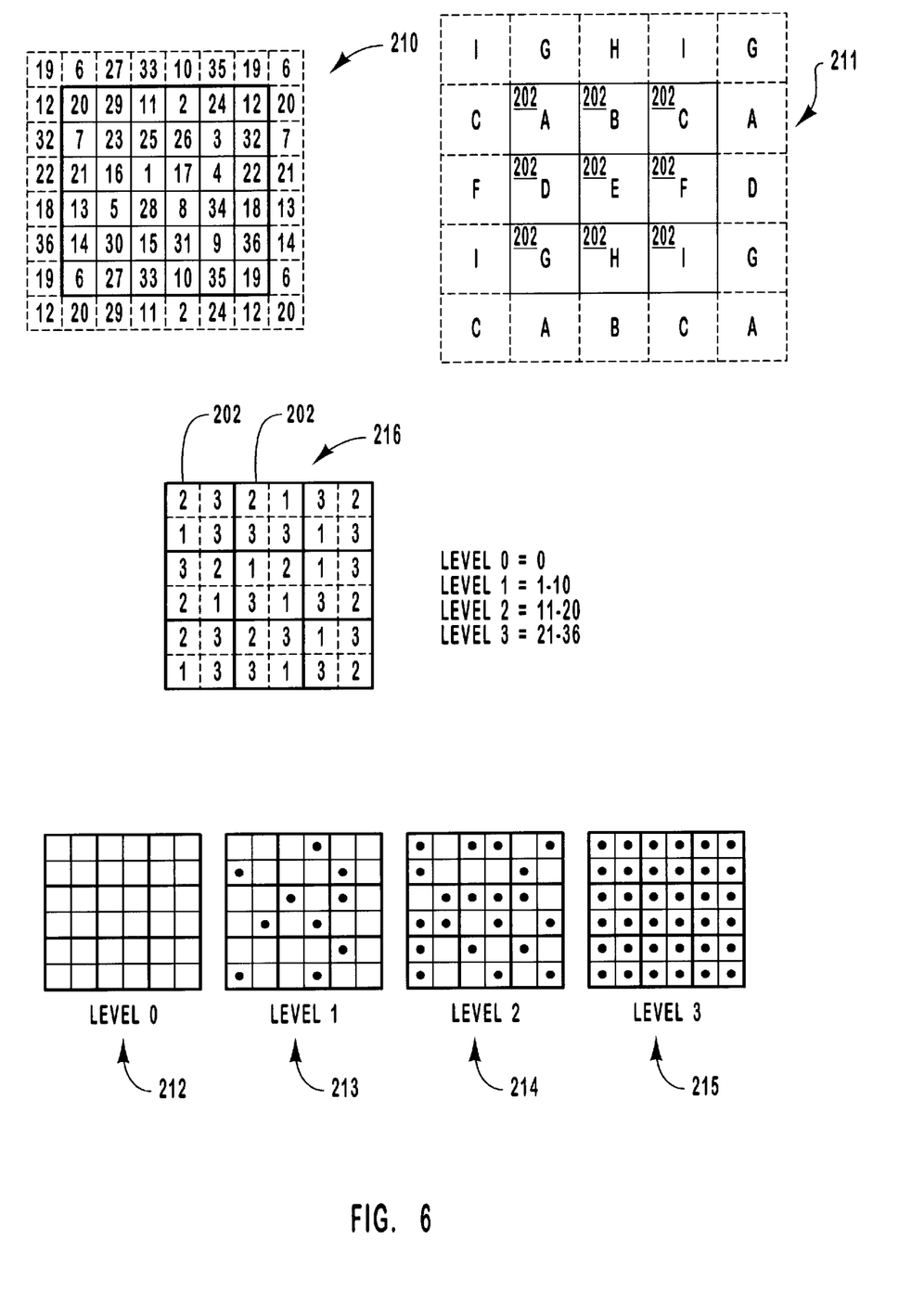
FIG. 6 is a block diagram illustrating the creation of a dot placement associated with output levels.

Another aspect of structure 220 relates to how the dot placements at each level or row are created or formed. Creation or formation of the dot placements is illustrated in FIG. 6. Array 210 is a halftone threshold array containing halftone threshold values. In the illustrated example, array 210 contains values ranging from 1 to 36. The numbers are for illustration purposes only and may vary depending on the particular halftone threshold array. In the embodiment illustrated in FIG. 6, array 210 is tessellated to fill a defined space such as an image.

Each value in array 210 is representative, in this embodiment, of a dot. Thus, array 210 can be divided into groups of dots which correspond to a particular pixel size as described previously. Pixel group 211 represents a group of pixels 202. Pixels 202, in FIG. 6, are sized to accommodate, in this illustration, a 2 by 2 dot array. In other words, each pixel 202 may contain 4 dots. Pixel group 211 contains the same number of dots as array 210 and pixel group 211 may be placed over array 210 such that particular threshold values reside inside of pixels 202. Because array 210 is tessellated, pixel group 211 may by offset. For instance, pixel A of pixel group 211 may contain threshold values of 20, 29, 7 and 23 or 29, 11, 23 and 25, or 12, 20, 32 and 7, or 7, 23, 21 and 16 or 6, 27, 20 and 29. By evaluating each position of pixel group 211 over array 210, the best output or dot placement may be determined.

After pixel group 211 is placed with relation to array 210, the dot placement may be prepared and each output level is determined. Structure 220, as shown in FIG. 5 has 256 potential output levels or rows which may contain distinct dot placements. In some embodiments, there may be fewer actual dot placements and much of the data in structure 220 may be redundant. In other words distinct rows in structure 220 may contain the same dot placement. Instead of reducing the number of levels, structure 220 is filled with redundant data, in a preferred embodiment, because the byte with which the level is accessed serves two separate purposes. First, the byte contains the level of the pixel, and the byte contains the output level of structure 220 which contains the appropriate dot placement for the level of the pixel. Within structure 220, each row is substantially equivalent to an output level and contains a dot placement for a group of one or more pixels.

Pixel group 216 is an illustration of pixel group 211, but is used to illustrate the dot placement of an output level. In this embodiment, an output level is defined when each pixel changes, which indicates that for a pixel to change, it must receive an additional dot. The first level, or level 0, is where no pixel contains a dot. The next level is reached when each pixel receives a dot. Using array 210, a dot is placed for the lowest threshold value in the array. The "1" in pixel group 216 illustrates where these dots are placed. As illustrated, some pixels may receive more than one dot before all pixels receive one dot. In the illustrated embodiment, each pixel in pixel group 216 receives a dot at threshold level 10. Thus pixel level 1 corresponds to threshold values 1 through 10, and dot placement 213 illustrates the actual dot placement of ink for an output level one.

To determine the next level, array 210 is used and dots are added to pixel group 216 until each pixel receives an additional dot as indicated by the "2" placed in pixel group 216. This occurs at a threshold value of 20. Thus threshold values of 11 to 20 correspond to a pixel level of 2. Dot placement 214 illustrates the actual placement of ink for an output level two.

In a similar manner, dot placement 215 illustrates the actual dot placement of ink for an output level three. For level 3, each pixel receives at least one additional dot at threshold value 35. In this illustration, there are 36 values, but there is no level 4 because all the pixels cannot receive an additional dot. Thus, level three may correspond to dot placement 215, or all dots except the dot for threshold level 36 may be placed. In a preferred embodiment, all dots would be placed. In this illustration, four levels were created to match with the potential four levels of a two by two dot array. However, it is possible to have a lesser number of actual output levels. This is one of the reasons that pixel group 211 may be placed in different locations on array 210, to produce or maximize the actual number of levels. Once the output levels and dot placements within the output levels are determined, they are placed in structure 220 and accessed as previously described.

Figure 7:
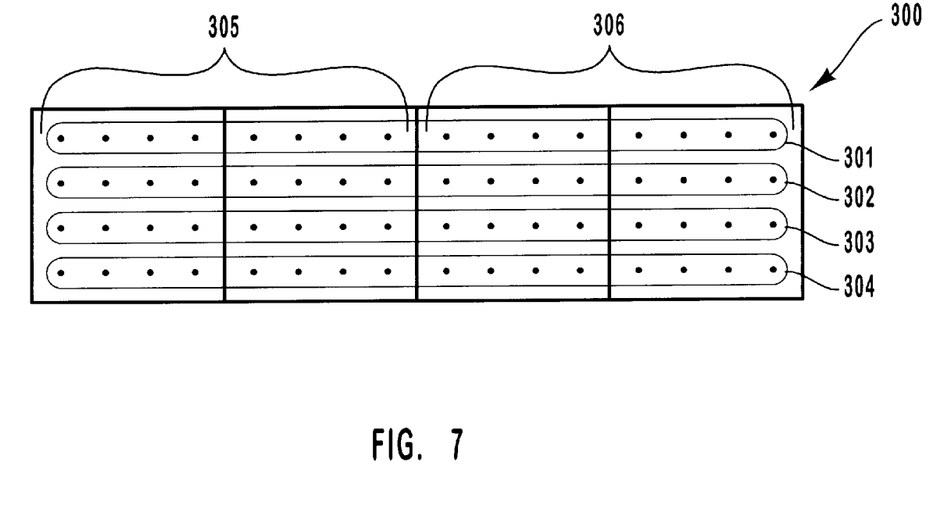
FIG. 7 is a schematic illustrating how the dots are placed or printed in pixels on a medium.

FIG. 7 is an illustration of how the image is printed on the surface. Line 300 represents a line of pixels which are to be printed. Row 301 represents the first row of dots for the illustrated pixels. Row 301 is printed in entirety in a preferred embodiment before row 302 is printed. Structure 220, illustrated in FIG. 5, stores the dot placements which are actually reproduced as dots on the printed or reproduced image. Returning to FIG. 7, byte 305 is printed over two pixels and the upper nibble of byte 305 is the first pixel and the lower nibble of byte 305 is the second pixel. Row 301 is stored in column A of structure 220, row 302 is stored in column B of structure 220, row 303 is stored in column C of structure 220 and row 304 is stored in column of column D of structure 220.

FIG. 7 is also illustrative of another embodiment of the present invention. As defined previously, a level is representative of ink that is placed on a medium and rather than representing the dot placement, the dots can represent levels in a different manner. For instance, consider a printer having the capability of printing a CMYK color scheme. This printer may have two heads for cyan and light cyan, two heads for magenta and light magenta, two heads for yellow and light yellow, and one head for black and one head for a spot ink to produce a color that CMYK cannot form. In this embodiment, byte 305 is representative of how the printer heads are to be fired. The first two bits of byte 305 may be used to determine the state of cyan. For example, a "00" would result in no cyan being placed, a "01" would result in light cyan being placed, a "10" would result in cyan being placed, and "11" would result in both light cyan and cyan being placed to create a dark cyan. The second and third pair of bits in byte 305 are similarly used for the two magenta and yellow heads. The seventh bit is used to either place or not place a spot of black ink and the eighth bit of byte 305 is used to place or not place a spot ink.

In another embodiment, a printer may have one cyan head, one magenta head, one yellow head and one black head. In this embodiment, each pair of bits in byte 305 can be used to represent four states for each head. A "00" may result in no ink being placed for a particular head, a "01" may result in the head placing a single dot, a "10" may result in the head firing two times, and a "11" may result in the particular head firing three times. In this manner, the quantity of ink can be varied for a particular pixel and different levels of ink can be placed or printed. Alternatively, each pair of bits in byte 305 can be used as a reference to a look up table which contains the firing sequence of the printer heads or which contains a dot placement for each of the respective colors.

The present invention permits an image to be processed at lower resolutions while being rendered at higher resolutions. An image can be processed at different resolutions while being rendered at the higher resolution. In other words, the memory required for the output file of decreases as the processing resolution is decreased. The time required to process the image is also reduced. However, the output image is printed at the higher resolution. This is one purpose of representing a pixel as an area to receive a certain level of ink. If a output device has the capability to print at 1440 dpi, it is possible to process the image at 1440 dpi. However, by grouping the dots into certain pixel sizes, the effective dpi at which the image is processed is reduced. For example, if the pixel size is four dots by four dots, then the image is being processed at 360 dpi. Clearly, the memory and time required to process a 360 dpi image is significantly less than the memory and time required to process a 1440 dpi image. A significant advantage is that all of the dots in the pixel are printed and the reproduced image is at the higher resolution.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. In a system that has multiple level pixel data that corresponds to a color image, a method for reproducing the color image on a medium, the method comprising steps for:

analyzing the multiple level pixel data to determine a dot placement schema and to determine valid pixel levels and to determine valid pixel sizes;

storing, in a data structure having one or more rows, dot placements for the dot placement schema within each row of the data structure, wherein each row corresponds to one or more of the valid pixel levels and wherein the data structure accommodates the valid pixel sizes, wherein each dot placement is representative of one or more of the valid pixel levels;

accessing specific rows of the data structure to obtain the dot placements for multiple pixels, wherein levels of the multiple pixels identify the specific rows that contain the dot placements for the one or more pixels of the image; and for each of the multiple pixels, placing dots on the medium according to the dot placements in the data structure.

2. A method as defined in claim 1, wherein each level is representative of an area of the image, wherein the area includes a plurality of pixels.

3. A method as defined in claim 1, wherein each level is representative of a percentage of ink.

4. A method as defined in claim 1, wherein each of the multiple pixels comprises one or more dots.

5. A method as defined in claim 4, wherein the one or more dots are arranged in an array having dimensions selected from the group: two by two, two by three, four by three, four by four, and four by six.

6. A method as defined in claim 1, wherein the data structure has 256 rows, 48 columns and is 6 bytes wide.

7. A method as defined in claim 1, wherein the step of placing the dots further comprises a step for accessing the data structure based on the levels of the multiple pixels to be placed.

8. A method as defined in claim 1, wherein the dot placements for more than one pixel are simultaneously processed and provided as output to an output device capable of placing dots.

9. A method as defined in claim 1, wherein the structure is repeated for a pixel group.

10. A computer-readable medium having computer executable instructions for performing the steps recited in claim 1.

11. A method for rendering an halftone image from multiple level pixel data, the method comprising acts of:
analyzing the multiple level pixel data to determine valid pixel output levels;
creating a structure for storing the valid pixel output levels of the halftone image, wherein the structure includes one or more rows that correspond to the valid pixel output levels;
processing the multiple level pixel data such that each pixel included in the multiple level pixel data is associated with one of the valid pixel output levels;
placing dot placements in the structure for each of the valid pixel output levels;
accessing the one or more rows of the structure using the valid pixel output level associated with each of the pixels in the multiple level pixel data to identify a particular row of the structure that stores the dot placement for the valid pixel output level; and
for each pixel, causing the dot placement in the structure that is associated with the valid pixel output level of the pixel to be placed on a medium.

12. A method as defined in claim 11, wherein the structure further comprises a plurality of columns representing lines of dots.

13. A method as defined in claim 11, wherein each of the pixels comprises a plurality of dots.

14. A method as defined in claim 11, wherein each of the pixels is represented by a dot array having dimensions selected from the group of: two by two, two by three, four by three, four by four, and four by six.

15. A method as defined in claim 11, wherein the dot placements is representative of an amount of ink.

16. A method as defined in claim 11, wherein each of the acts is repeated for each color in a color scheme.

17. A method as defined in claim 16, wherein the color scheme is CMYK.

18. A method as defined in claim 11, wherein the dot placement stored in the each of the one or more rows of the structure is randomized.

19. A method as defined in claim 11, wherein the act of placing the dot placement further comprises an act of accessing the structure according to the level of the pixels being rendered on the medium.

20. A method as defined in claim 11, wherein the structure is repeated for a pixel group.

21. A method as defined in claim 11, wherein the pixels are representative of a resolution lower than the resolution of the rendered image.

22. A computer-readable medium having computer-executable instructions for performing the steps recited in claim 11.

23. In a system capable of receiving multiple level pixel data, a method for reproducing the multiple level pixel data as a halftone image, the method comprising acts of:
assigning each of the multiple pixels included in the multiple level pixel data to a valid output level;
generating a structure that includes rows, wherein the rows store all potential dot placements for all potential levels of the multiple pixels, and wherein each row of the structure stores dot placements for one or more pixels;
accessing the structure according to the valid output level of the one or more pixels, wherein the valid output level of each pixel identifies a particular row of the structure; and
outputting to an output device the dot placement of each pixel that is stored in the rows of the structure that correspond to the valid output level of each pixel.

24. A method as defined in claim 23, wherein the act of outputting to an output device further comprises an act of causing the output device to print dots on a medium that mirror the dot placement contained in the data structure for each pixel.

25. A method as defined in claim 23, wherein the act of representing each of the one or more pixels further comprises acts of:
creating a look up table that is referenced by the level of the one or more pixels;
storing, in the look up table, a firing sequence for the output device.

26. A method as defined in claim 25, wherein the act of outputting to an output device further comprises an act of causing the output device to print an amount of ink related to the level in the look up table.

27. A method as defined in claim 23, wherein the acts are repeated for each color in a color scheme.

28. A method as defined in claim 27, wherein the color scheme is CMYK.

29. In a system including an image that is to be reproduced on a medium, a computer-readable medium having a plurality of data fields stored on the medium and representing a data structure for storing dot placements of the image, the data structure comprising:
one or more first data fields that contain data representing one or more levels, wherein each first data field stores a dot placement for the one or more levels and wherein the each data field is identified by a level of a pixel in the image;
one or more second data fields, each second data field is accessible from one of the one or more first data fields, wherein each of the one or more second data fields contains data representing a portion of a pixel, wherein each one or more second data fields is accessed during a processing operation on the one or more first data fields whereby a dot placement is determined.

30. A computer-readable medium as defined in claim 29, wherein each of the one or more first data fields contains a dot placement for one or more pixels of the image.

31. A computer-readable medium as defined in claim 29, wherein each portion of a pixel comprises zero or more dots.

32. A computer program product for implementing a method for reproducing a half tone image from multiple level pixel data, the computer program product comprising:

a computer-readable medium carrying computer-executable instructions for implementing the method, wherein the computer-executable instructions comprise:

program code means for dividing the half tone image into one or more valid output levels and for assigning each of the one or more pixels to one of the valid output levels;

program code means for generating a structure that includes rows, wherein the rows store all potential dot placements for all of the valid output levels of the one or more pixels, and wherein the structure corresponds to multiple pixels;

program code means for accessing the structure according to the level of the one or more pixels, wherein the level of each pixel identifies a particular row of the structure; and         program code means for outputting to an output device the dot placement of each pixel that is stored in the rows of the structure that correspond to the level of each pixel.

33. A computer program product as in claim 32, wherein the program code means for representing each of the one or more pixels as a level further comprises program code means for storing a firing sequence of an output device which is referenced by the level of the one or more pixels.

\* \* \* \* \*

UNITED STATES PATENT AND TRADEMARK OFFICE
CERTIFICATE OF CORRECTION

PATENT NO. : 6,445,466 B1
DATED : September 3, 2002
INVENTOR(S) : Maxim Wasyl Derhak It is certified that error appears in the above-identified patent and that said Letters Patent is hereby corrected as shown below:

Column 2,
Line 18, delete "be able to"

Column 3,
Line 49, change "place" to -- placed --

Column 7,
Line 51, change "dot," to -- dots --

Column 8,
Line 64, change "level" to -- levels --

Column 10,
Line 40, change "by" to -- be --

Column 11,
Line 47, delete "column of"

Column 12,
Line 21, delete "of"
Line 26, after "if" change "a" to -- an --

Column 13,
Line 10, after "group" insert -- of --
Line 27, change "an" to -- a --

Signed and Sealed this

Thirtieth Day of March, 2004

JON W. DUDAS
*Acting Director of the United States Patent and Trademark Office*